(No Model.)
D. A. RANKINE.
APPARATUS FOR FILTERING WATER, &c.
No. 511,798.
2 Sheets—Sheet 1.
Patented Jan. 2, 1894.
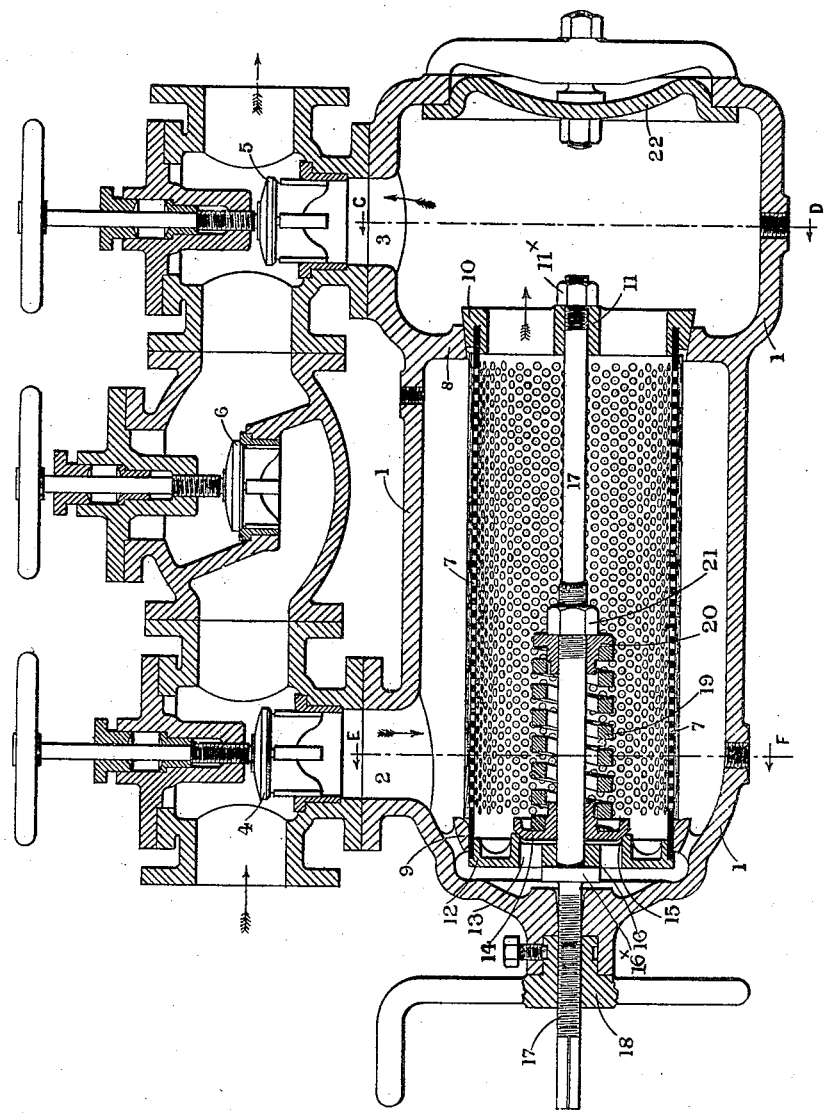

(No Model.) 2 Sheets—Sheet 2.
D. A. RANKINE.
APPARATUS FOR FILTERING WATER, &c.
No. 511,798. Patented Jan. 2, 1894.
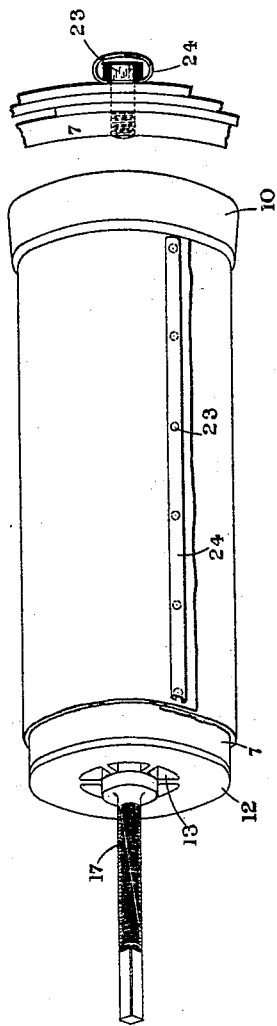
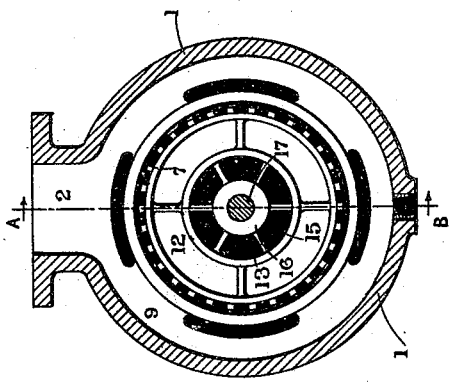
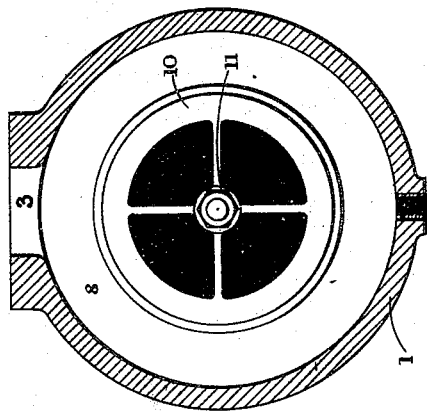

UNITED STATES PATENT OFFICE.

DAVID A. RANKINE, OF WATERLOO, NEAR LIVERPOOL, ENGLAND.

APPARATUS FOR FILTERING WATER, &c.

SPECIFICATION forming part of Letters Patent No. 511,798, dated January 2, 1894.

Application filed February 27, 1893. Serial No. 463,851. (No model.)

*To all whom it may concern:*

Be it known that I, DAVID ANDREW RANKINE, a subject of the Queen of Great Britain, residing in Waterloo, near Liverpool, in the county of Lancaster, England, have invented certain new and useful Improvements in Apparatus for Filtering Water, especially applicable for filtering feed-water for steam-generators, of which the following is a specification.

This invention relates to filters of the class described by me in the specification accompanying an application for Letters Patent, Serial No. 439,857, and the object of my present invention is to facilitate the removal and renewal of the filtering medium and to provide means for allowing the water to flow through the filter chamber without passing through the filtering medium when the pressure necessary to drive it through the latter exceeds the maximum permissible pressure.

In the accompanying drawings which serve to illustrate my invention, Figure I shows the apparatus in longitudinal section on the line A. B. of Fig. III; Figs. II and III being transverse sections on C. D. and E. F. of Fig. I, respectively, the valves being omitted. Fig. IV shows the removable portion of the apparatus with the filtering medium in position; and Fig. V is an enlarged view showing the method of securing the filtering medium on the perforated tube.

Throughout the drawings the same parts are indicated by the same reference figures and in the case of sections the direction in which they are viewed is indicated by the arrows placed adjacent to the letters denoting the plane of section.

The filter chamber and the arrangement of the external valves resembles that described in the prior specification referred to and consists of a casing 1 having an inlet 2 and outlet 3, controlled by the valves 4 and 5 respectively; the valves 4 and 5 are connected by the stop valve 6 which forms a by-pass valve and which is normally closed so that the feed water to be filtered passes from the inlet 2 through the casing to the outlet 3. When it is desired to throw the filter out of operation the valves 4 and 5 are closed and 6 is opened.

According to my present invention the roll of filtering medium is supported on the outside of a perforated tube 7, which is supported concentrically within the casing 1, by the annular diaphragm 8 located near the outlet end of the casing, and the perforated seating 9 at the opposite end; the internal configuration of the annular diaphragm is conical and the end of the tube 7 which is supported therein is provided with an annular seating 10 adapted to make joint therewith, said seating having a central boss 11 carried by radial ribs. The opposite end of the tube is fitted with an end piece 12 which, with the exception of an annular passage 13 controlled by the valve 14, closes the end of the tube. The seating 15 for the valve 14 is formed on the end piece 12 and the central boss 16 is carried from this seating by radial ribs.

The tube 7 is secured in position by the stud 17 which is secured to the bosses 11 and 16 by the collar 16$^\times$ and nut 11$^\times$ shown, and which has a prolongation passing through a hole in the end of the casing. The prolongation is screwed and provided with a combined nut and handle 18, capable of rotation but prevented from moving laterally and which is adapted to draw the tube into position and secure it and also to eject the tube. The valve 14 is pressed on its seating by a spring 19, adjusted by the collar 20 and nut 21 on the stud 17. The casing is provided with a removable door 22 secured in position after the manner of a boiler man-hole door, the opening being large enough to allow the tube 7 with its seating 10 to be withdrawn.

The roll of filtering medium is secured in position on the tube 7 as shown in Figs. IV and V; a number of studs 23 are screwed into the tube 7, and a suitable length of the filtering medium, which consists preferably of the fabric known as "Turkish toweling" woven in suitable widths, is taken, and a number of slits are cut along one edge said slits being passed over the studs; the medium is then wound once round the tube and a second series of slits are cut, which are also passed over the studs, and so on for each successive convolution to the end of the length, the whole being kept in position by means of the split tube 24 which slides on to the heads of the studs as shown.

The action of the apparatus is as follows: The valves 4 and 5 being open and 6 closed, the feed water enters by the inlet 2 and, as the valve 14 is so loaded by the spring 19 that it remains closed until the pressure reaches the maximum permissible in the casing, which is of course in excess of the normal pressure against which the feed water has to flow, the feed water can only flow when the pressure is normal, through the filtering medium from outside the tube 7 and thence to the outlet 3, any impurities being arrested by the filtering medium; when the latter becomes so charged with the impurities that the pressure exceeds the maximum permissible the valve 14 opens and the feed water flows from the inlet through the perforations in the seating 9, through the valve and through the interior of the tube 7 to the outlet, the pressure in this way being relieved. When the medium requires to be changed, the tube 7, its seating 10, end piece 12, valve 14, spring 19, stud 17 and the filtering medium are withdrawn as a whole, and a duplicate set, on which new medium has been fixed, is inserted so that the time required to interchange is a minimum.

Having now fully described my invention, what I claim, and desire to secure by Letters Patent, is—

1. In combination, a filter chamber having an inlet and outlet laterally located, a cylindrical roll of filtering medium, and a perforated tube adapted to support the filtering medium on the outside thereof across the water way, one end of said tube being closed and having an opening a spring-loaded valve controlling said opening, the other end being provided with an annular seating and an annular diaphragm extending from the walls of the chamber between the inlet and outlet, and joining said seating substantially as described and illustrated.

2. In combination, the filter chamber having an inlet and outlet laterally located; an annular diaphragm 8 and a perforated seating 9; the cylindrical roll of filtering medium 25; the perforated tube 7 having an annular seating 10 and an end piece 12 provided with an opening 13 a spring-loaded valve 14 controlling said opening; the stud 17 secured to the seating 10 and end piece 12 and passing through the end of the chamber, and the nut 18 which is prevented from moving laterally and is adapted to secure the tube 7 in position and to eject it, substantially as described and illustrated.

3. In combination, the filter chamber; the roll of filtering medium; the perforated tube 7 having an annular seating 10 and an end piece 12 provided with a central opening; the stud 17, and the valve 14 guided by the said stud, a collar 20, a nut on the stud for adjusting said collar and a spring abutting against the collar for loading the valve, substantially as described.

4. In combination, the tube 7, the roll of filtering medium encircling the same, the studs 23 screwed in said tube and the split tube 24, engaging said studs substantially as described and illustrated.

In testimony whereof I have hereunto set my hand in the presence of two subscribing witnesses.

DAVID A. RANKINE.

Witnesses:
ROBT. A. SLOAN,
*Patent Agent.*
J. E. LLOYD BARNES,
*Patent Agent,* 26 *Castle Street, Liverpool.*